(12) United States Patent
Shimizu

(10) Patent No.: US 11,167,431 B2
(45) Date of Patent: Nov. 9, 2021

(54) MOUNTING BRACKET

(71) Applicant: FANUC CORPORATION, Yamanashi (JP)

(72) Inventor: Ryouta Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 98 days.

(21) Appl. No.: 16/715,043

(22) Filed: Dec. 16, 2019

(65) Prior Publication Data

US 2020/0238543 A1 Jul. 30, 2020

(30) Foreign Application Priority Data

Jan. 24, 2019 (JP) .............................. JP2019-009997

(51) Int. Cl.
    *B25J 19/00* (2006.01)
    *H02G 11/00* (2006.01)
    *B25J 17/02* (2006.01)

(52) U.S. Cl.
    CPC ........... *B25J 19/0025* (2013.01); *B25J 17/02* (2013.01); *H02G 11/00* (2013.01)

(58) Field of Classification Search
    CPC .............................. B25J 17/02; B25J 19/0025
    USPC ......................................... 74/490.05, 490.06
    See application file for complete search history.

(56) References Cited

U.S. PATENT DOCUMENTS 6,014,909 A    1/2000   Fiora
9,197,052 B2 * 11/2015   Kume .................... H02G 11/00

2003/0060929 A1   3/2003   Kullborg
2005/0034552 A1   2/2005   Back et al.
2008/0223170 A1   9/2008   Tealdi et al.
2013/0306603 A1   11/2013   Ferrero et al.
2014/0130631 A1   5/2014   Kume

FOREIGN PATENT DOCUMENTS

EP      0 873 826 A2    10/1998
EP      1 970 171 A1    9/2008
JP      H10329079 A    12/1998
JP      2005508762 A    4/2005

(Continued)

OTHER PUBLICATIONS

Japanese Office Action dated Mar. 9, 2021, in connection with corresponding JP Application No. 2019-009997 (9 pp., including machine-generated English translation).

*Primary Examiner* — William C Joyce
(74) *Attorney, Agent, or Firm* — Maier & Maier, PLLC

(57) ABSTRACT

A mounting bracket includes: a first flange mounted on a wrist leading end surface of a robot allowing a linear object to penetrate therethrough along a rotation center axis of a wrist leading end, the first flange having a first through-hole through which the linear object passes; a second flange that is spaced apart from the first flange in a direction of the rotation center axis and on which an end effector is mounted; and a cylindrical coupling part coupling an outer edge of the first flange and an outer edge of the second flange, the coupling part is provided with opening parts through which the linear object penetrated through the first through-hole passes, and at least at positions of the opening parts, the outer edge of the second flange is disposed in a position closer to the rotation center axis than the outer edge of the first flange.

7 Claims, 9 Drawing Sheets

(56) References Cited

FOREIGN PATENT DOCUMENTS

| | | |
|---|---|---|
| JP | 2008221457 A | 9/2008 |
| JP | 2014-094440 A | 5/2014 |
| JP | 2016-215371 A | 12/2016 |
| WO | 03/015998 A1 | 2/2003 |

* cited by examiner ial Application No. 2019-009997, the content of which is incorporated herein by reference.

FIELD

The present disclosure relates to a mounting bracket.

BACKGROUND

A linear object guide device on a wrist leading end portion of an industrial robot has been known (for example, Japanese Unexamined Patent Application, Publication No. 2014-94440). This linear object guide device includes a linear object guide member interposed between a rotational shaft member of the wrist leading end portion of the robot and an end effector.

The linear object guide member includes a first plate part mounted on the wrist leading end portion and a second plate part mounted on the end effector, which are disposed in such a way as to face each other, and a coupling part coupling the first plate part and the second plate part. The coupling part is provided with an opening part. The linear object penetrated through the rotational shaft member of the wrist leading end portion of the robot can pass through a through-hole of the first plate part and be taken out from the opening part to the outside.

SUMMARY

One aspect of the present disclosure is a mounting bracket which includes: a first flange that is mounted on a wrist leading end surface of a robot which allows a linear object to penetrate therethrough along a rotation center axis of a wrist leading end, the first flange having a first through-hole through which the linear object passes; a second flange that is spaced apart from the first flange in a direction of the rotation center axis and on which an end effector is mounted; and a cylindrical coupling part that couples an outer edge of the first flange with an outer edge of the second flange, the coupling part is provided with an opening part through which the linear object penetrated through the first through-hole passes, and at least at a position of the opening part, the outer edge of the second flange is disposed in a position closer to the rotation center axis than the outer edge of the first flange.

DETAILED DESCRIPTION OF EMBODIMENTS

Figure 1:
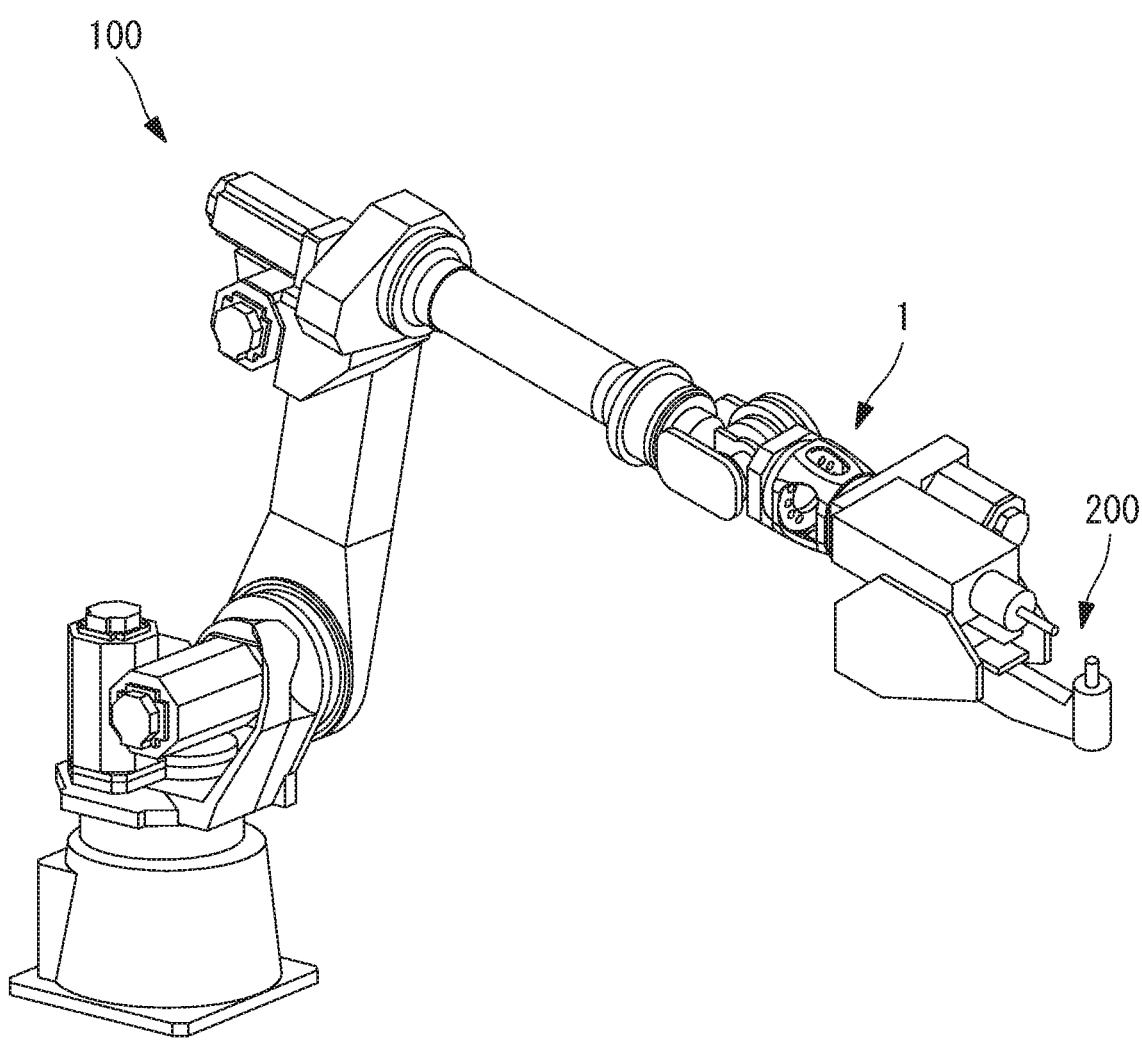
FIG. 1 is a perspective view showing a state in which an end effector is mounted on a robot by a mounting bracket according to one embodiment of the present disclosure.

Hereinafter, a mounting bracket 1 according to one embodiment of the present disclosure will be described with reference to the accompanying drawings. As shown in FIG. 1, the mounting bracket 1 according to the present embodiment is a member which is mounted on a wrist leading end surface of a robot 100 and fixes an end effector 200 on the wrist leading end surface. Although the end effector 200 is optional, the end effector 200 shown in FIG. 1 as an example is a welding gun.

As shown in FIG. 2 to FIG. 8, the mounting bracket 1 includes a first flange 11 which is fixed on the wrist leading end surface of the robot 100, a second flange 12 which is disposed in parallel with the first flange 11 and spaced apart from the first flange 11 in a direction of a rotation center axis X of a wrist leading end, and a cylindrical coupling part 13 which connects an outer edge of the first flange 11 and an outer edge of the second flange 12.

Figure 3:
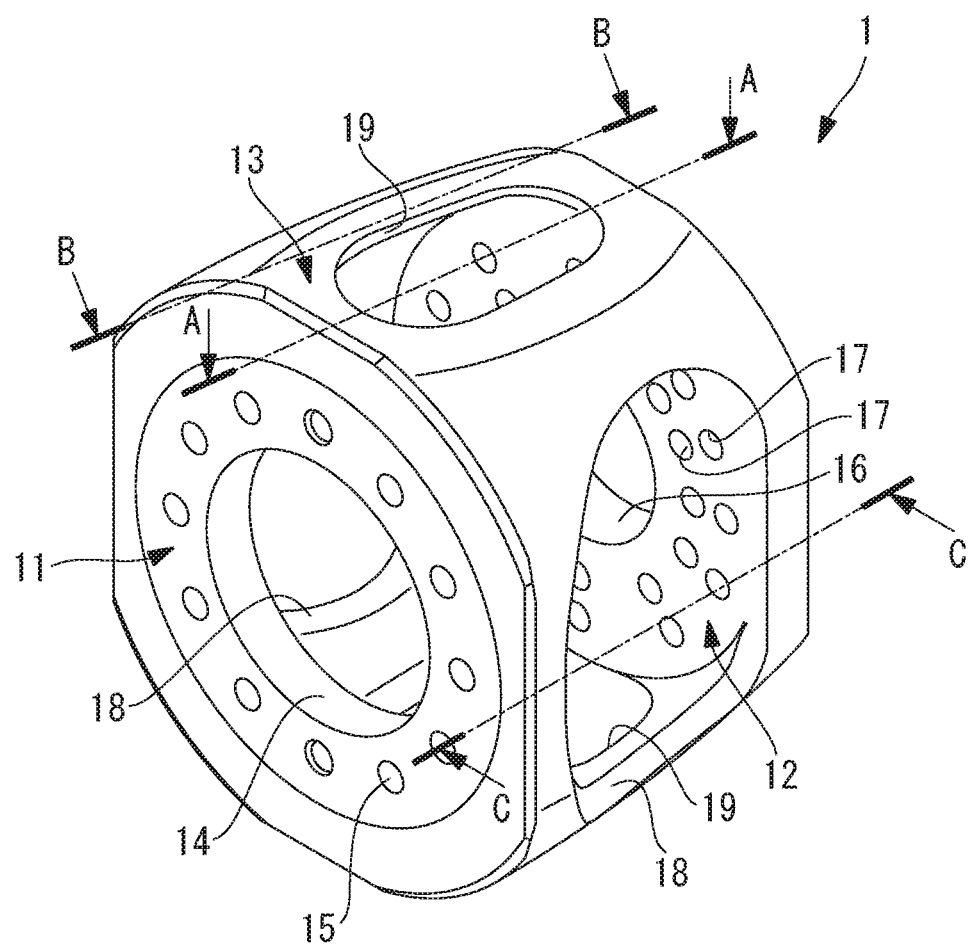
FIG. 3 is a perspective view in which the mounting bracket in FIG. 1 is viewed from a side of a first flange.

As shown in FIG. 3, the first flange 11 is configured to be of a disk shape and includes a first through-hole (through-hole) 14 which penetrates in a central portion thereof in a plate thickness direction. In addition, the first flange 11 includes a plurality of mounting holes 15 which are arranged outwardly in a radial direction of the first through-hole 14 in such a way as to be spaced apart from one another in a circumferential direction and penetrate in the plate thickness direction. Bolts, not shown, for fixation on the wrist leading end surface of the robot 100 are caused to penetrate through the mounting holes 15.

Figure 4:
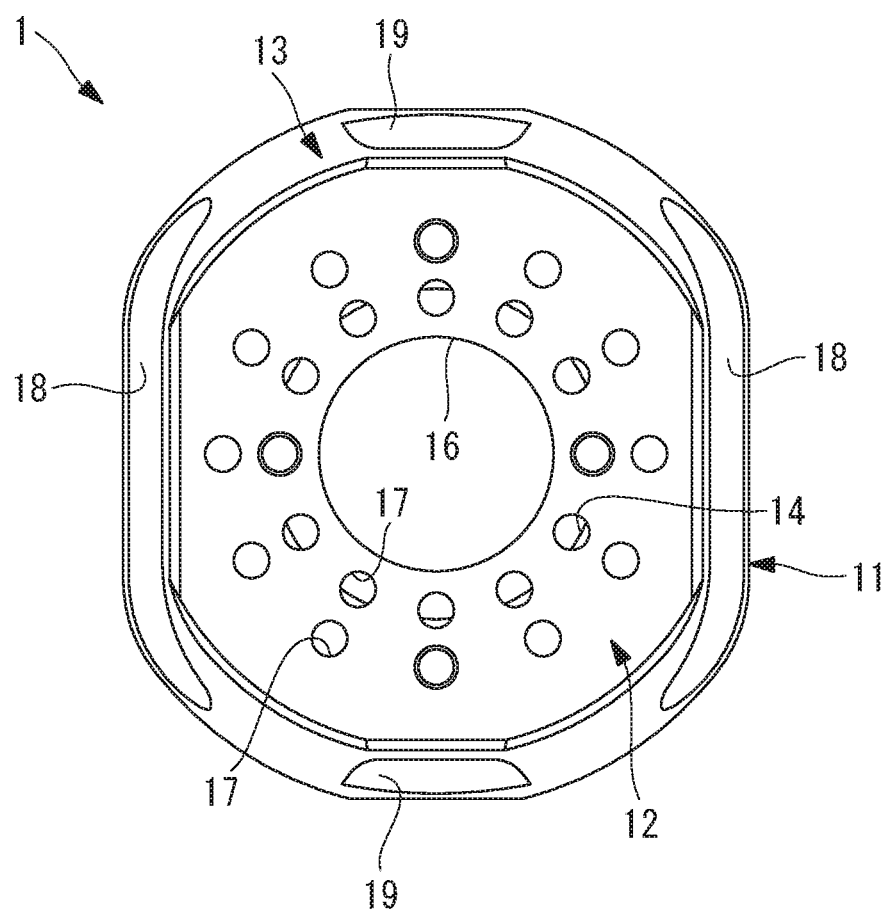
FIG. 4 is a front view of the mounting bracket in FIG. 1.

As shown in FIG. 4, the second flange 12 is disposed concentrically with the first flange 11 and is configured to be of a disk shape having an outer diameter smaller than an outer diameter of the first flange 11. The second flange 12 includes, in a central portion thereof, a second through-hole 16 which penetrate in a plate thickness direction.

In addition, the second flange 12 includes a plurality of screw holes 17 which are arranged outwardly in a radial direction of the second through-hole 16 in such a way as to be spaced apart from one another in a circumferential direction and penetrate in the plate thickness direction. Bolts for fixation on the end effector 200 are fastened in the screw holes 17. In FIG. 4, the screw holes 17 are arranged in two rows in a concentric manner, allowing the end effector 200 having a different interface to be mounted.

Figure 2:
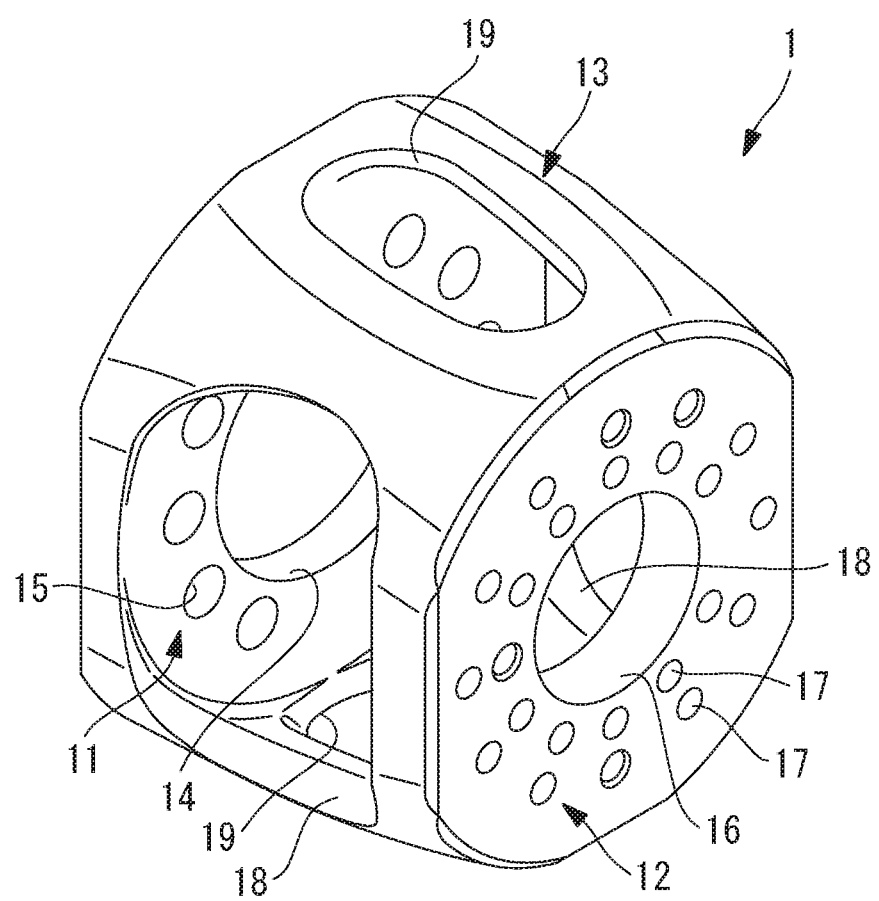
FIG. 2 is a perspective view in which the mounting bracket in FIG. 1 is viewed from a side of a second flange.

As shown FIGS. 2 and 3, the coupling part 13 connects the outer edges of the first flange 11 with the second flange 12 whose outer diameters are different from each other and is formed to be of a truncated conical cylindrical shape which tapers from the first flange 11 toward the second flange 12. The coupling part 13 is provided with two first opening parts (opening parts) 18 which penetrate in a diameter direction and two second opening parts (opening parts) 19 smaller than the first opening parts 18.

Figure 5:
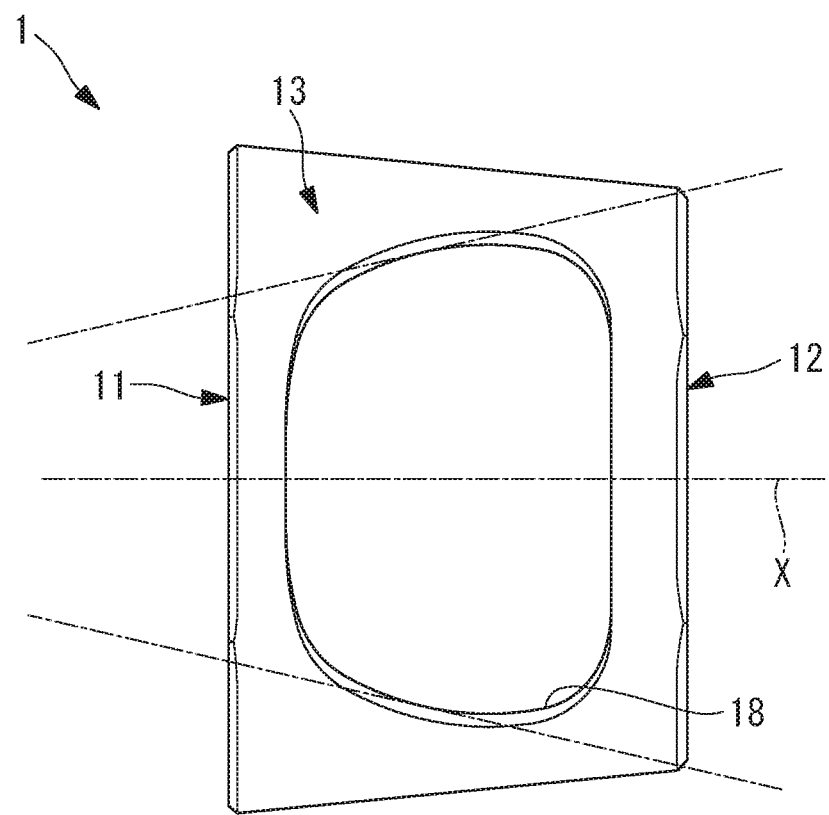
FIG. 5 is a side view in which the mounting bracket in FIG. 1 is viewed from a side of a first opening part.

As shown in FIG. 5, each of the first opening parts 18 is formed by connecting a plurality of curves having curvatures which are different from each other and straight lines. The curve and the curve which neighbor each other as well as the curve and the straight line which neighbor each other share a normal line at respective connecting points, respectively, thus forming each of the first opening parts 18 which is smoothly continuous without steps and has an opening shape having no corners. In the present embodiment, as indicated by broken chain lines in FIG. 5, each of the first opening parts 18 has a shape which is wider near the second flange 12 than near the first flange 11, that is, which is widened in a direction toward a leading end thereof along the rotation center axis X.

Figure 6:
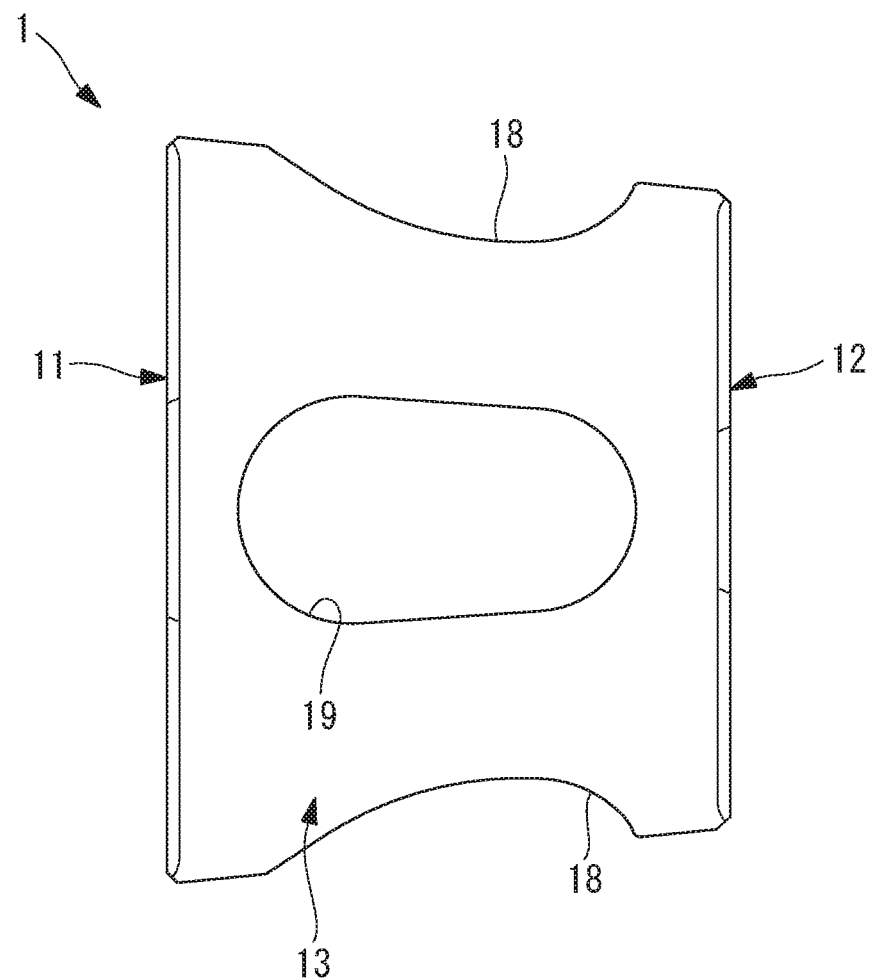
FIG. 6 is a side view in which the mounting bracket in FIG. 1 is viewed from a side of a second opening part.

As shown in FIG. 6, each of the second opening parts 19 is also formed by connecting a plurality of curves having curvatures which are different from each other and straight lines. The curve and the curve which neighbor each other as well as the curve and the straight line which neighbor each other share a normal line at respective connecting points, respectively, thus forming each of the second opening parts 19 which is smoothly continuous without steps and has an opening shape having no corners. In the present embodiment, conversely to each of the first opening parts 18, as shown in FIG. 6, each of the second opening parts 19 has a shape which is wider near the first flange 11 than near the second flange 12, that is, which is widened in a direction toward a base end thereof along the rotation center axis X.

As described above, the second flange 12 is configured to be of the disk shape having the outer diameter smaller than the outer diameter of the first flange 11 and is disposed concentrically with the first flange 11. Thus, not only in positions of the first opening parts 18 and the second opening parts 19 but also all positions in the circumferential direction, the outer edge of the second flange 12 is disposed in a position closer to the rotation center axis X than the outer edge of the first flange 11.

Figure 7:
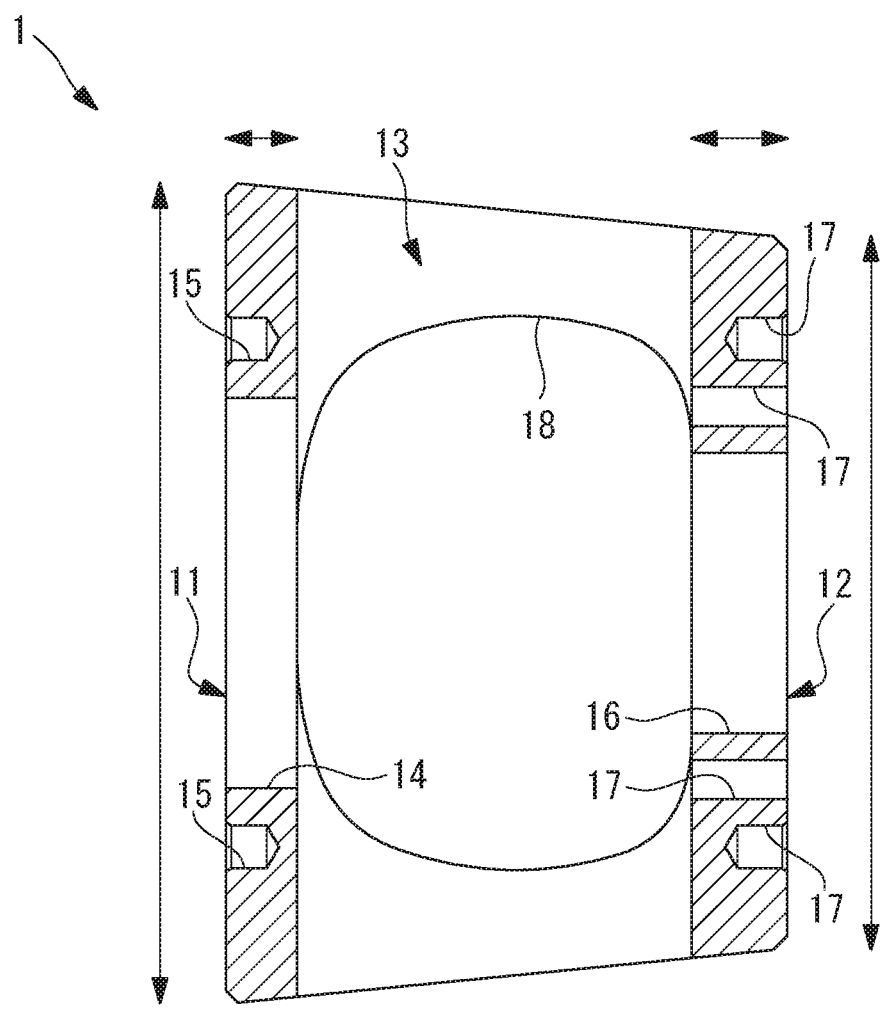
FIG. 7 is a sectional view of the mounting bracket along line A-A in FIG. 3.
Figure 8:
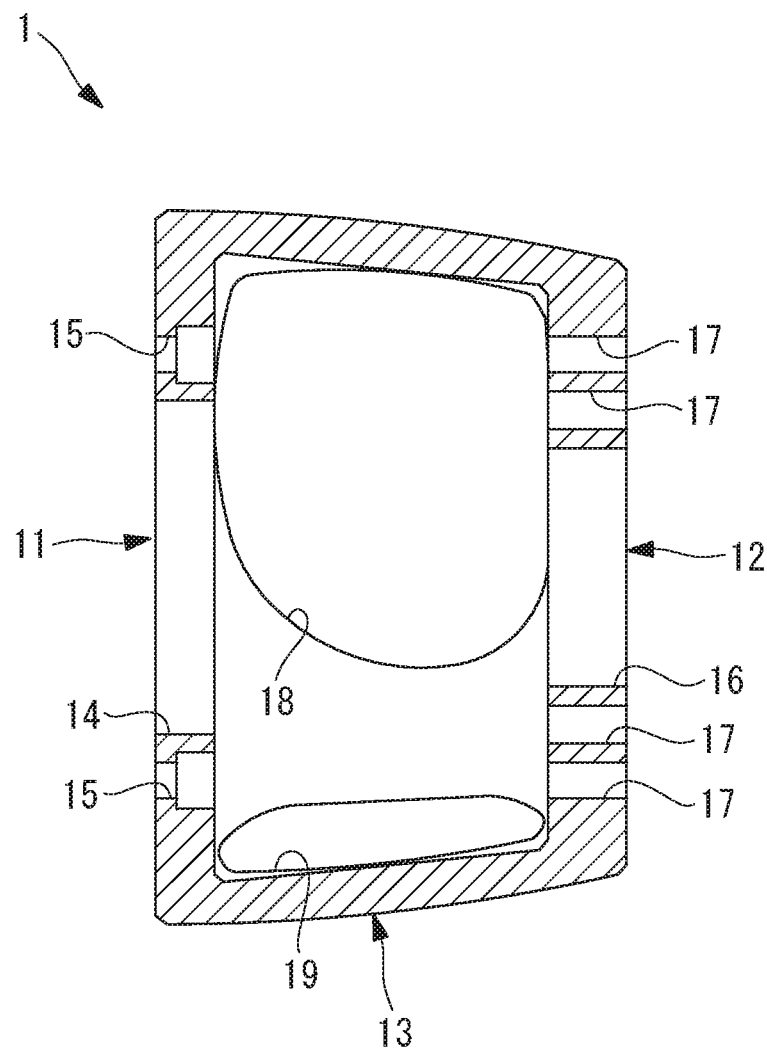
FIG. 8 is a sectional view of the mounting bracket along line B-B in FIG. 3.

In addition, as shown in FIG. 7, the second flange 12 is configured to be thicker than the first flange 11. Furthermore, as shown in FIG. 8, a wall thickness of the coupling part 13 is smoothly changed such that the wall thickness of the coupling part 13 in an end portion thereof in proximity to the first flange 11 and the second flange 12 becomes smallest and the wall thickness in a position in the vicinity of a central portion thereof where the first opening parts 18 and the second opening parts 19 are closest to each other in the circumferential direction becomes largest.

Hereinafter, an operation of the mounting bracket 1 according to the present embodiment, which is configured as described above, will be described. According to the present embodiment, as shown in FIG. 1, the first flange 11 is mounted on the wrist leading end surface of the robot 100, and the end effector 200 is mounted on the second flange 12, thereby allowing the end effector 200 to be supported on the wrist leading end of the robot 100 with the mounting bracket 1 interposed therebetween.

In the above-mentioned state, a linear object 150 which is caused to penetrate through the wrist leading end surface of the robot 100 along the rotation center axis X is passed through the first through-hole 14 of the first flange 11 and thereafter, is taken out via an opening provided for the coupling part 13 to the outside. The taken-out linear object 150 is connected to the end effector 200, thereby completing wiring work. As the linear object 150, in addition to a cable for motor driving, a power feeding cable, a pipe for supplying a cooling fluid, a pipe for supplying compressed air, and the like can be cited.

Figure 9:
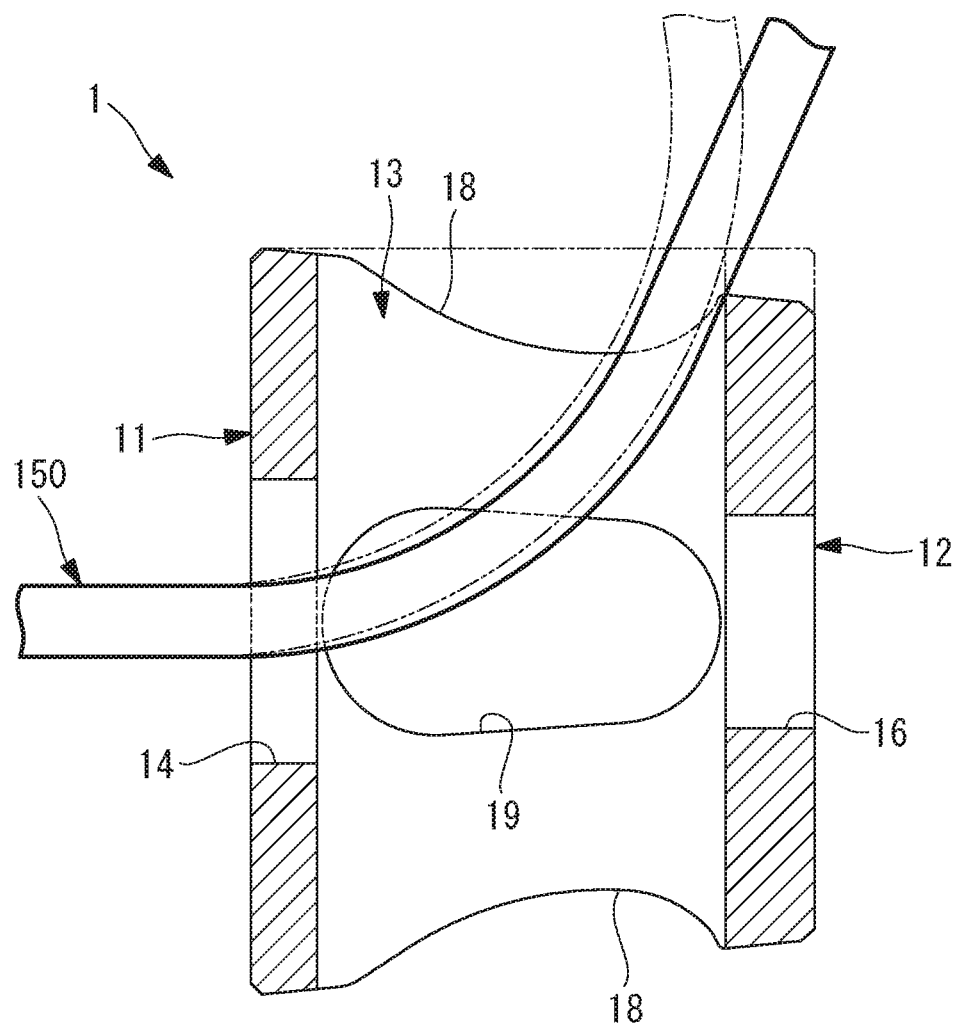
FIG. 9 is a sectional view of the mounting bracket along line C-C in FIG. 3.

In this case, as shown in FIG. 9, the linear object 150 taken out via the first through-hole 14 of the first flange 11 from the wrist leading end surface of the robot 100 along the rotation center axis X is curved in a direction in which the linear object 150 comes to be away from the rotation center axis X, whereby the linear object 150 is taken out from the opening parts 18 and 19 of the coupling part 13 to the outside. In the mounting bracket 1 according to the present embodiment, the outer edge of the second flange 12 is disposed in a position closer to the rotation center axis X than the outer edge of the first flange 11 in a position of each of the first opening parts 18.

A broken chain line in FIG. 9 indicates a case in which the outer edge of the first flange 11 and the outer edge of the second flange 12 are disposed in the same positions with respect to the rotation center axis X. As compared with this case, as indicated by a solid line in FIG. 9, by employing the mounting bracket 1 according to the present embodiment, it is not required to largely bend the linear object 150 taken out from the first opening parts 18, whereby a large bending radius is advantageously ensured. In other words, the large bending radius of the linear object 150 is ensured and taking-in and taking-out thereof is thereby facilitated, whereby workability is advantageously enhanced. In addition, a burden exerted on the linear object 150 is reduced, thereby allowing the linear object 150 to be used in a durable manner.

In addition, in the present embodiment, since as shown in FIG. 5, each of the first opening parts 18 has the shape which becomes wider gradually toward the leading end thereof, in a case in which plural amounts of the linear object 150 are present, larger amounts of linear object 150 are passed through positions on leading end sides of the first opening parts 18, thereby allowing the linear object 150 to be taken out to the outside of the mounting bracket 1. In other words, a large bending radius of each of the larger amounts of linear object 150 is advantageously ensured.

Since as shown in FIG. 5, the opening shape of each of the first opening parts 18 is formed to be widened toward the leading end, and as shown in FIG. 6, the opening shape of each of the second opening parts 19, which are disposed between the first opening parts 18, is formed to be widened toward the base end, a width dimension of the coupling part 13, which is disposed between the first opening parts 18 and the second opening parts 19, is prevented from being made extremely small toward the leading end. Thus, the large first opening parts 18 are advantageously ensured, thereby allowing wiring work of the linear object 150 to be facilitated and stiffness of the coupling part 13 can advantageously be maintained.

Furthermore, since each of the first opening parts 18 and each of the second opening parts 19 are formed by connecting the plurality of curves having the curvatures which are different from one another and the straight lines, and the curve and the curve which neighbor each other as well as the curve and the straight line which neighbor each other are made to share the normal line at the respective connecting points, respectively, each of the opening shape which is smoothly continuous without the steps and has no corners is configured. Thus, stress concentration occurring on the first opening parts 18 and the second opening parts 19 can advantageously be minimized.

In addition, in the present embodiment, since as shown in FIG. 7, a thickness dimension of the second flange 12 having an area smaller than an area which the first flange 11 has is set to be large, stiffness of the mounting bracket 1 can be enhanced. In addition, since as shown in FIG. 8, the thickness dimension of the coupling part 13 coupling the first flange 11 with the second flange 12 is smoothly changed, and the shape the coupling part 13 in which the thickness thereof in the vicinity of the position where the first opening parts 18 and the second opening parts 19 are closest to each other becomes largest is set, a reduction in stiffness caused by a decrease in the thickness of the coupling part 13 can advantageously be prevented.

In addition, in the present embodiment, as shown in FIG. 2 and FIG. 3, in positions in the circumferential direction, which correspond to the opening parts 18 and 19, the shape in which portions of the outer edges of the first flange 11 and the second flange 12 are cut out by planar surfaces is formed. Since these portions do not exert large influence on stiffness, weight reduction can advantageously be made by cutting out these portions.

The invention claimed is:

1. A mounting bracket comprising:
   a first flange that is mounted on a wrist leading end surface of a robot which allows a linear object to penetrate therethrough along a rotation center axis of a wrist leading end, the first flange having a through-hole through which the linear object passes;
   a second flange that is spaced apart from the first flange in a direction of the rotation center axis and on which an end effector is mounted; and
   a cylindrical coupling part that couples an outer edge of the first flange with an outer edge of the second flange, wherein
   the coupling part is provided with an opening part through which the linear object penetrated through the through-hole passes,
   at least at a position of the opening part, the outer edge of the second flange is disposed in a position closer to the rotation center axis than the outer edge of the first flange,
   the opening part includes a first opening part and a second opening area of the second opening part being smaller than an opening area of the first opening part, and
   at least one of the first opening part and the second opening part has a shape which is wider near the second flange than near the first flange.

2. The mounting bracket according to claim 1, wherein an area of the first flange is larger than an area of the second flange.

3. The mounting bracket according to claim 1, wherein the first opening part and the second opening part are alternately disposed in a circumferential direction.

4. The mounting bracket according to claim 3, wherein each of the first opening part and the second opening part has an opening shape formed by connecting a plurality of curves or straight lines over whole circumference, and
   the curves and the straight lines have a common normal line at connecting points.

5. The mounting bracket according to claim 4, wherein a wall thickness of the coupling part is largest in a position where the first opening part and the second opening part are closest to each other.

6. The mounting bracket according to claim 1, wherein
   the first opening part has the shape which is wider near the second flange than near the first flange, and
   the second opening part has a shape which is wider near the first flange than near the second flange.

7. The mounting bracket according to claim 1, wherein a thickness dimension of the second flange is larger than a thickness dimension of the first flange.

\* \* \* \* \*